Dec. 4, 1934. W. M. ALBRIGHT 1,982,942
CUSHION STOP FOR SHEARS
Filed Jan. 21, 1933

INVENTOR.

William M. Albright

UNITED STATES PATENT OFFICE 1,982,942

CUSHION STOP FOR SHEARS

William M. Albright, Hemet, Calif.

Application January 21, 1933, Serial No. 652,835

1 Claim. (Cl. 30—11)

This invention relates more particularly to cushion stops for that type of shears used commonly for clipping and pruning hedges, shrubbery and trees, and which are of a large size requiring two hands to operate. Such shears are often provided with a solid metallic stop to prevent the blades of the shears from passing one another, or to prevent the handles of the shears from striking together when operated; but when in operation, the two members of the shears are arrested in their movement, one relative to the other, the impact of one member against the stop causes a hard, sudden shock sufficiently severe to cause a jar and pain in the hands and arms of the operator. Especially is this true with pruning shears when cutting hard twigs and small branches. An operator in using such an implement for long will be greatly inconvenienced and caused pain by the repeated jar.

To relieve this situation is an object of the present invention. Another object is to provide a means for the purpose which will relieve the jar on the operator and which may be quickly and easily applied to the shears. Another object is to provide a device for the purpose which may be easily manufactured, is simple in construction, economical and durable.

Figure 1:
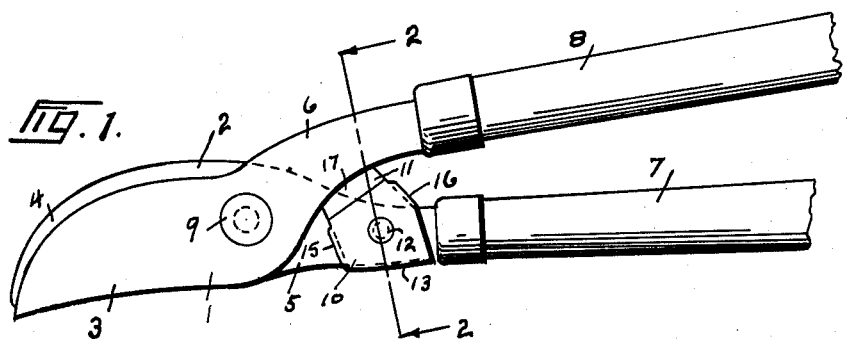
Figure 2:
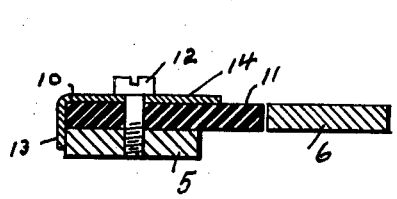
Figure 3:
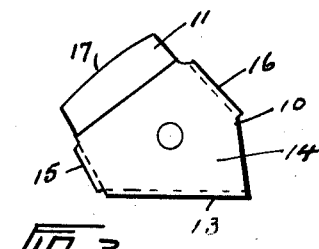
Figure 4:
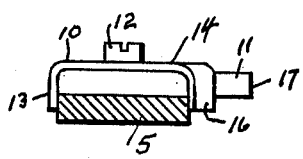
Figure 6:
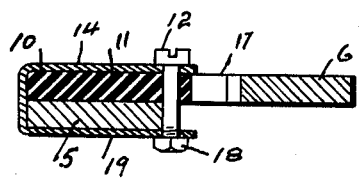
Figure 5:
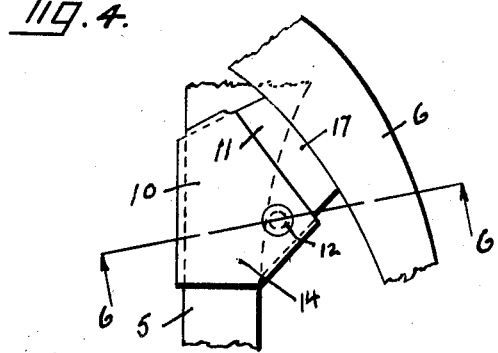

Other objects and advantages of my invention will become more apparent from the following specifications when considered in connection with the accompanying drawing, in which:

Fig. 1 is a side elevation of a typical pair of heavy shears of a common type to which a cushioned stop of the character herein considered is attached, Fig. 2 is a cross section on the line 2—2 of Fig. 1, showing the position of the stop when attached to one of the members of the shears and the relative position of the other member of the shears when it engages the stop, Fig. 3 is an enlarged plan view of the stop showing more clearly its construction, Fig. 4 is a side elevation showing the stop as attached to a member of a pair of shears in which the member is shown in section, Fig. 5 is a plan view of a modified form as attached to a member of a pair of shears and fragmentary view of the shear members, and, Fig. 6 is a section on the line 6—6 of Fig. 5 showing more clearly the method of attachment.

Referring to the drawing with more particularity, the typical shears shown in Fig. 1 consists of two members, 1 and 2 having blades 3 and 4, shanks 5 and 6 and handles 7 and 8. The two members are hingedly held together by means of the hinge bolt 9. As the two members are moved about the hinge bolt 9, the shanks 5 and 6 are moved to and from each other.

The cushion stop consists of a case 10, a resilient pad 11 and attaching bolt 12. The device as illustrated in Figs. 1, 2, 3 and 4 is attached to the shank 5 of one member of the shears by means of a bolt 12 which passes through the case 10 and the resilient pad 11 and is threaded into the shank 5. The case 10 is preferably formed in one piece from sheet metal in shape to conform to the requirements and having a flat body portion 14. A flange portion 13 is bent at approximately right angles to the body portion and projects sufficiently to form a stop or gauge against the shank 5. A flange portion 15 is bent at approximately right angles to the body portion to form an enclosing means to more securely hold the resilient pad 11 in position, and a flange portion 16 is bent approximately at right angles to the body portion to form an enclosing means to more securely hold the resilient pad 11 in position. The flange portion 16 extends sufficiently to engage the shank 5 to act also as a stop against the shank 5 to prevent movement of the case 10 about the securing bolt 12.

When the device is in position and secured to the shank 5, as illustrated in Figs. 1, 2, 3, and 4, the resilient pad is inserted beneath the case 10 and held in position by the case and flange portions 13, 15 and 16. A portion 17 of the pad projects from the case to engage the shank 6 of the shears when the members of the shears are brought together. The pad 11 thus acts as a resilient, or cushioned, stop to arrest the movement of the shank 6 relative to the shank 5 and reduces the suddenness of the shock of the two members coming together.

Figs. 5 and 6 illustrate a modified form of my invention in which the case and pad are held to the shank 5 by means of a bolt 12 and nut 18, the bolt passing past the edge of the shank 5. To make the use of the bolt and nut possible, the case 10 has an extension 19, Fig. 6, which extends below the member 5 and beyond its edge, the bolt 12 passing through the extension 19. The shape of the case is thus modified, slightly, to accommodate the bolt which acts also as a stop against the shank 5.

The departure of the modified form from the preferred form is more particularly the manner in which the bolt is employed. In the preferred form it is necessary to drill and tap a hole in the shank 5 for the bolt, while in the modified form the bolt passes outside the shank 5 and the case is held to the shank by clamping.

Having thus described my invention, what I claim is:

A cushion stop attachment for a pair of shears comprising, a flat case constructed and arranged to be secured to the side of one of the hafts of the shears, said case having flanges constructed and arranged to engage the haft to which said case is attached and partially enclose a resilient pad, a flat resilient pad partially enclosed in said case and held in position by said flanges, said pad disposed between said case and said haft and abutting against said flanges, and means including a bolt for securing and compressing said case and said pad to said haft, in a manner to hold said pad under compression.

WILLIAM M. ALBRIGHT.